May 29, 1945.  W. E. SMITH  2,376,943

ELECTRODE HOLDER

Filed Dec. 3, 1942

INVENTOR.
WILLIAM E. SMITH.
BY *Louis W. Clemetz*

Patented May 29, 1945

2,376,943

UNITED STATES PATENT OFFICE 2,376,943

ELECTRODE HOLDER

William E. Smith, Detroit, Mich., assignor to The Midland Steel Products Company, Cleveland, Ohio, a corporation of Ohio Application December 3, 1942, Serial No. 467,759

10 Claims. (Cl. 219—8)

This invention relates to new and useful improvements in electrode holders designed to hold fusible electrodes for arc welding purposes and an important object of the invention is to provide a simplified, balanced electrode holder of greater efficiency and conductivity, and one by which about 10% saving in electrode or weld rod material is effected by reason of the holder permitting more length of each electrode being used in the welding operation. This object is accomplished by providing a clamp-less holder of such construction that the electrode can be fused or welded integrally to the holder at any angle desired and can be readily displaced from the same by a blow without damage to the holder or any parts thereof.

Another object of the invention is to provide such construction which permits of the electrode being removably clamped, if desired.

A further object of the invention is to provide an electrode holder consisting of simply two parts.

Other objects and advantages of the invention will become apparent during the course of the following description.

Figure 1:
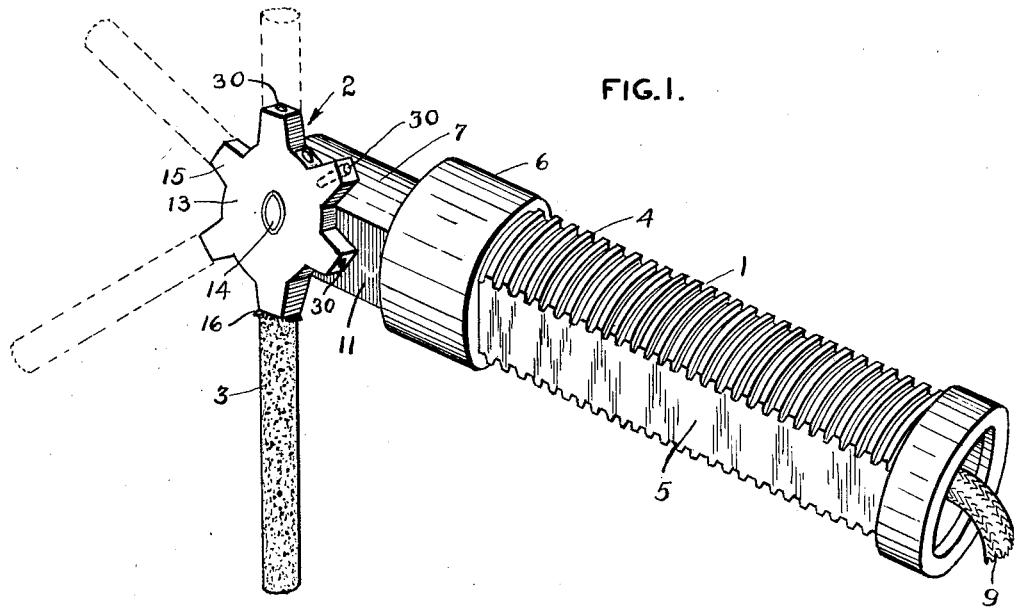
Figure 2:
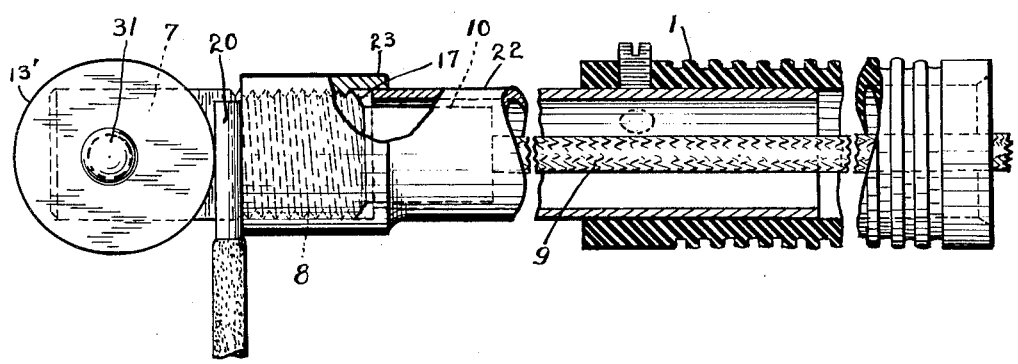
Figure 3:
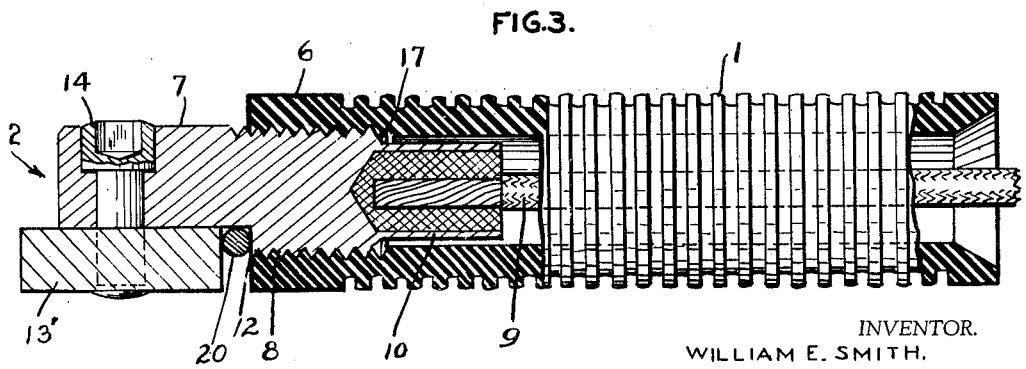

In the accompanying drawing forming a part of the description and wherein like numerals are employed to designate like parts throughout the several views, Fig. 1 is a perspective view of the improved electrode holder illustrating the ends of electrodes or weldrods fused integrally therewith, Fig. 2 is a side elevation of a modified form of the invention employing a clamp, Fig. 3 is a longitudinal section of another form of the same.

Heretofore, most electrode holders with which I am familiar, employ some kind of clamping means for removably holding the electrode or weldrod while welding. Because of the vulnerability of such clamping means, these holders soon become damaged from heat and from being thrown and knocked about. They are unwieldy and fatiguing to the grip of the operator. Moreover, they are comparatively expensive to manufacture and to replace. This invention finds special usefulness with expensive alloy steel weldrods of the larger sizes, i. e. ⅜ to ½ inch diameters.

Fundamentally, my preferred improved holder consists of an insulated handle 1 having a conductor head or piece 2, to which an electrode or weldrod 3 is directly and integrally fused to be thereby held in position for welding. Thus, the improved holder consists simply of two parts.

The handle 1 is simply a tube of insulating material such as Bakelite or a fibrous material and its main body is provided with a plurality of circumferentially arranged ribs 4. The finger grip side of the handle is flattened lengthwise as at 5 to facilitate holding the head normal for proper welding technique. This handle is provided with an enlarged internally threaded head 6 and is hollow throughout its length as best shown in Fig. 3.

The head 2 is composed of a cylindrical rod 7 of copper or other suitable conducting material and may even be composed of hard steel. The inner end of this rod is externally screw threaded to be received in the threaded end of the handle and is axially bored to have the free end of a conductor cable 9 sweated or brazed therein close to the free end of the head and in good electrical contact therewith. This welding cable 9 extends lengthwise through the tubular handle 1 and to the source of welding current. For enlarging the electrical connection between the head and cable, the head is provided with a reduced tubular extension 10 and this also provides the head with a shoulder 17 in case the handle assumes the form shown in Fig. 2. One side of the head 7 is removed or flattened as at 11 to provide a lateral shoulder 12 as best seen in Fig. 3. This flat face 11 provides a surface to which the butt end of an electrode or coated weldrod 3 may be fused or welded to be held in proper position for effective welding.

If refinement of this head be desired, a hardened steel ½ inch thick plain disc 13 may be removably secured to the flattened face 11 of the head so that the periphery of such disc extends well laterally beyond the sides of the head and handle 1, in order that the coated electrode 3 can be conveniently fused to any portion of the disc and the butt end or stub of the used electrode can be readily dislodged after consummation of the same.

It is to be particularly noted that the electrode or weldrod 3 does not have a bared end as is customary, but is coated with the slag-flux coating throughout its entire length whereby 10% more of the length of such electrode can be consumed in welding; a very material saving. With such weldrods, only the transverse end of the core rod is exposed for contact with and fusion to the periphery of the disc 13.

As further refinement of this holder and of the contact disc 13, the latter may be removably and rotatably mounted upon the head 7 by means of an Allen screw 14 extending transversely through the head with its free end threadedly associated with a central tapped opening in the disc 13.

When this screw is tightened to draw the disc against the flat face 11 of the head, the disc is rendered non-rotatable and is fixed, and when the screw is turned to remove it from the disc 13, the latter may be removed for dressing or replacement.

As further refinement, the periphery of the disc 13 may be provided with one or more radially projecting teeth 15, to the free end of which the butt end of the weldrod is adapted to be lightly fused just sufficiently to retain it in position while it is being used for arc welding. After the weldrod has been consumed in the welding operation and leaves its butt end attached to the disc, it can be readily displaced or detached from the disc or its projection by knocking the butt end against any object. A new weldrod can then be held with its arcing end against the work while current is passed through the holder and the periphery or lug 15 of the disc 13 is touched to the end of the electrode to fuse it to the projection 15 as indicated by the fused material 16. These projections 15 or the periphery of the disc 13 may have inwardly tapering radial sockets or holes 30 for the insertion, attachment and proper support of the ends of small diameter weldrods which are less than ¼ inch diameter. Several weld rods may be fused to the disc 13 so as to project radially and forwardly thereof, so that as each electrode is consumed, the disc or handle may be turned to properly present the next electrode to the work, without the necessity of knocking off the used stub and fusing a new electrode to the disc at the moment.

As a modification of the device and where it is desired to clamp the usual bared end electrode 20 in the holder, a cam disc 13' can be rotatably mounted upon the head 7 so that its periphery is spaced from the shoulder 12 of the head to clamp the bared end of the electrode against the same when the cam is slightly turned to present its major radii to the electrode. In this case, the screw 14 would be replaced by an axle 21 to at all times rotatably mount disc 13 on the holder. By simply turning the cam in one direction the electrode can be inserted between the cam and the shoulder 12 and by turning the cam in the opposite direction the cam can be brought into engagement with the electrode to force it firmly against the shoulder 12 and thereby clamp it in the holder. Where it is desired to make half of the handle of insulating material and the other half of metal, a metallic tube 22 has one end inserted and fastened in the end of the insulating handle by a pair of screws spaced 60° apart and its other end 23 enlarged and internally threaded for the reception of the threaded end 8 of the conductor head 7 which presents its shoulder 17 for abutment with the end of a metallic tube 22 in order to limit the extent to which the head 7 may be driven into the handle to thereby predetermine the extent of the space between the shoulder 12 and the periphery of the cam 13'. Without a shoulder 17, the metallic portion of the handle can be turned upon the threaded portion 8 to move lengthwise relative thereto and clamp the weldrod against the cam 13' or a fixed contact member which may be substituted for the cam.

It is desirable that the contact disc 13 of the form shown in Fig. 1 be constructed of tough hard material such as alloy steel and be securely connected with the conductor head so that it will be capable of withstanding the blows necessary to dislodge the used butt ends of weldrods therefrom.

Also, it is desirable that the periphery of the contact disc 13 extend beyond the sides of the contact head 7 whereby weldrod stub dislodging blows will not injure the holder. This arrangement is also desirable when a cam disc 13' is employed so that it may be rolled upon an object to clamp and release the electrode.

It will be understood that various changes in the size, shape and relation of parts may be resorted to without departing from the spirit of the invention or the scope of the appended claims.

I claim:

1. An electrode holder having a handle, and a conductor disc mounted upon an axis arranged transversely of the holder with the disc projecting beyond the end and sides of the holder, and said disc being of such thickness that an electrode can be secured to the broad curved peripheral face thereof at any point about an axis extending transversely of the holder.

2. An electrode holder having a handle, and a thick conductor disc with its center axis transverse to said handle secured thereto in firm electrical contact therewith and with its broad curved periphery presenting a surface of sufficient width to which an electrode having a diameter of one-half inch can be firmly secured to extend at any desired angle about said axis arranged transverse to said handle and in a plane parallel to the flat side of said disc.

3. An electrode holder having a handle, a conductor head secured thereto and having an opening extending transversely thereof and the handle, a conductor piece to which electrodes are adapted to be secured and having an opening to align with the opening in said head, and a screw extending through said aligned openings for rigidly and removably securing said piece to said head.

4. An electrode holder having a handle, a conductor head secured thereto and having a flat surface parallel to the axis of said handle and an opening at an angle to said surface and extending therethrough, a removable piece to which electrodes are secured having an opening in alignment with the opening in said head, and a screw extending through said aligned openings to clamp said piece firmly against said flat surface of said head.

5. An electrode holder having a handle, a conductor head of stock having one end for engagement with said handle and the side of the other end provided with a flat surface, and a member to which electrodes are secured, attached in firm electrical conductivity with said flat surface.

6. An electrode holder having a handle, a conductor head secured thereto and comprising round rod copper stock having one end exteriorly threaded and bored to receive an electric cable, the other end of said conductor head being provided with a broad flat surface with an opening extending transversely of the longitudinal axis of said handle, a removable piece to which electrodes are secured having an opening in alignment with the opening in said head, and a screw extending through said aligned openings to clamp said piece in firm electrical contact with said flat surface of said head.

7. An electrode holder comprising an insulated hollow handle, a metal tube having one end secured to said handle and its other end internally threaded, a copper conductor head having one end externally threaded to be screwed into the threaded end of the metal tube and provided with a pocket to receive a conductor cable extending through the handle and tube, the other end of said head having a flat surface extending lengthwise of the axis of the head, and a thick metal disc removably fastened to said flat surface of said head in good electrical contact therewith and having its periphery extending beyond the head for the fusion of weld rods thereto.

8. An electrode holder having a handle, a conductor head secured thereto and having an opening extending transversely thereof and of the handle, a disc, to the periphery of which electrodes are adapted to be secured, and screw means extending through said opening for rigidly and removably securing said disc to said head.

9. An electrode holder having a handle, a conductor head secured thereto and having a flat face arranged in a plane parallel to the longitudinal plane of the handle, and a member removably secured in good electrical conductivity to said flat face and provided with a surface to which electrodes are adapted to be secured.

10. An electrode holder having a handle, and a rotatable conductor disc having a plurality of radially projecting teeth, each tooth being provided with a tapered socket into which the end of a weld rod is adapted to be inserted.

WILLIAM E. SMITH.